United States Patent
Idaka

(10) Patent No.: US 11,172,137 B2
(45) Date of Patent: Nov. 9, 2021

(54) CONTROL APPARATUS, CONTROL METHOD, AND STORAGE MEDIUM

(71) Applicant: CANON KABUSHIKI KAISHA, Tokyo (JP)

(72) Inventor: Sayuri Idaka, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/111,281

(22) Filed: Dec. 3, 2020

(65) Prior Publication Data

US 2021/0176401 A1 Jun. 10, 2021

(30) Foreign Application Priority Data

Dec. 10, 2019 (JP) .............................. JP2019-223286

(51) Int. Cl.
H04N 5/232 (2006.01)

(52) U.S. Cl.
CPC ..... H04N 5/23299 (2018.08); H04N 5/23245 (2013.01)

(58) Field of Classification Search
CPC ........... H04N 5/23299; H04N 5/23245; H04N 5/232; H04N 5/23261; H04N 5/23296; G02B 15/14; G01S 3/7864; G08B 13/19608; G03B 5/00
USPC ....................................................... 348/373
See application file for complete search history.

(56) References Cited

U.S. PATENT DOCUMENTS

| | | | | |
|---|---|---|---|---|
| 7,088,512 B2* | 8/2006 | Haga | ...................... | G02B 23/00 359/554 |
| 8,031,227 B2* | 10/2011 | Neal | ......................... | G01S 5/16 348/169 |
| 8,054,336 B2* | 11/2011 | Vanderwilt | .......... | H04N 5/2251 348/211.14 |
| 10,237,482 B2* | 3/2019 | Ohara | ................ | G08B 13/1963 |
| 2004/0136068 A1* | 7/2004 | Haga | .................... | G02B 27/646 359/554 |
| 2006/0197840 A1* | 9/2006 | Neal | ......................... | G01S 5/16 348/169 |
| 2012/0002075 A1* | 1/2012 | Yoshizumi | ........... | H04N 5/2251 348/229.1 |
| 2012/0120249 A1* | 5/2012 | Yoshizumi | ......... | H04N 5/23218 348/169 |
| 2014/0376768 A1* | 12/2014 | Troy | ..................... | G01S 3/7864 382/103 |

(Continued)

FOREIGN PATENT DOCUMENTS

JP 2016224353 A 12/2016

Primary Examiner — Pritham D Prabhakher
(74) Attorney, Agent, or Firm — Canon U.S.A., Inc. IP Division

(57) ABSTRACT

An apparatus includes a rotation detection unit, a direction determination unit, a position detection unit, and a control unit configured to perform control such that the position detection unit is energized in a case where the rotation direction determined by the direction determination unit is a first direction where the first member and the second member approach each other, and that the position detection unit is not energized in a case where the rotation direction determined by the direction determination unit is a second direction where the first member and the second member separate from each other.

19 Claims, 12 Drawing Sheets

(56) References Cited

U.S. PATENT DOCUMENTS

| | | | |
|---|---|---|---|
| 2015/0015461 A1* | 1/2015 | Morimoto | G02B 27/017 345/8 |
| 2016/0269648 A1* | 9/2016 | Hayashi | H04N 5/23206 |
| 2017/0230580 A1* | 8/2017 | Ohara | H04N 5/23245 |
| 2019/0158747 A1* | 5/2019 | Ohara | G03B 17/561 |
| 2019/0353988 A1* | 11/2019 | Yamasaki | H04N 5/232933 |
| 2019/0373170 A1* | 12/2019 | Fujita | G03B 37/04 |
| 2020/0077027 A1* | 3/2020 | Onaka | H04N 5/23296 |
| 2020/0084355 A1* | 3/2020 | Ishii | G06T 7/90 |

* cited by examiner

CONTROL APPARATUS, CONTROL METHOD, AND STORAGE MEDIUM

BACKGROUND OF THE DISCLOSURE

Field of the Disclosure

The aspect of the embodiments relates to a control apparatus, a control method, and a storage medium.

Description of the Related Art

Conventionally, a technique for controlling energization of a photointerruptor (PI) that detects a focus position in accordance with a zoom position has been known (see, for example, Japanese Patent Application Publication Laid-Open No. 2016-224353).

SUMMARY OF THE DISCLOSURE

According to an aspect of the embodiments, an apparatus includes a rotation detection unit configured to detect rotation of a rotating body, a determination unit configured to determine a rotation direction of the rotating body based on an output of the rotation detection unit, a position detection unit configured to detect a predetermined position of the rotating body based on positions of a first member provided on the rotating body and a second member provided on a fixed section that moves relative to the rotating body, and a control unit configured to perform control such that the position detection unit is energized in a case where the determined rotation direction is a first direction where the first member and the second member approach each other, and that the position detection unit is not energized in a case where the determined rotation direction is a second direction where the first member and the second member separate from each other.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the accompanying drawings. The configurations illustrated in the following embodiments are merely examples, and the disclosure is not limited to the illustrated configurations.

A first exemplary embodiment of the disclosure will be described below with reference to FIGS. 1 to 4.

Figure 1:
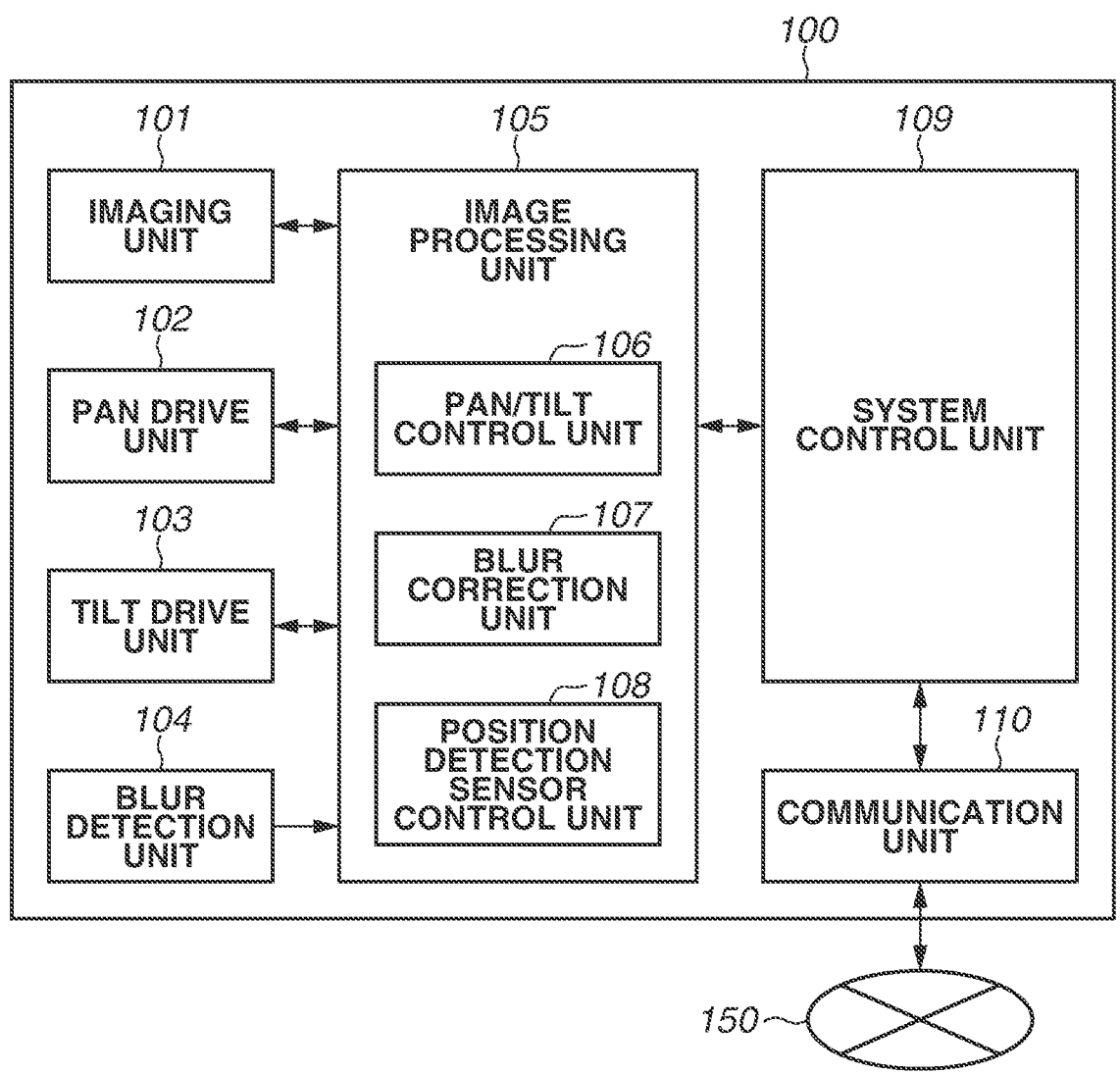
FIG. 1 is a functional block diagram of a pan/tilt camera according to a first exemplary embodiment.

FIG. 1 illustrates a functional block diagram of a pan/tilt camera according to the present exemplary embodiment. A camera 100 is connected to a client apparatus (information processing apparatus) (not illustrated) via a network 150 so as to be able to communicate with each other. A user can transmit various commands from the client apparatus to the camera 100. The camera 100 includes an imaging unit 101, a pan drive unit 102, a tilt drive unit 103, a blur detection unit 104, an image processing unit 105, a system control unit 109, and a communication unit 110. In addition, the image processing unit 105 includes a pan/tilt control unit 106, a blur correction unit 107, and a position detection sensor control unit 108.

The imaging unit 101 includes an imaging lens including a focus lens and a zoom lens, an imaging element, and a mechanical drive system and a circuit for driving them. The imaging unit 101 captures an image of a subject and converts the captured image into an electric signal. The imaging unit 101 is provided in a camera head 204 described below.

The pan drive unit 102 includes a mechanical drive system for pan operation, a motor of a drive source, a position detection sensor for detecting a position, and the like, and is controlled by the pan/tilt control unit 106. The detailed configuration will be described below with references to FIGS. 2A and 2B.

The tilt drive unit 103 includes a mechanical drive system for tilt operation, a motor of a drive source, a position detection sensor for detecting a position, and is controlled by the pan/tilt control unit 106. The detailed configuration will be described below with reference to FIGS. 2A and 2B.

The blur detection unit 104 includes an angular velocity sensor such as a gyro sensor and various filters for removing noise, and detects the angular velocity of the imaging unit 101 in the yaw direction and the pitch direction. The angular velocity sensor is installed on the imaging unit 101 to detect the yaw direction and the pitch direction of the imaging unit 101. The angular velocity sensor may be disposed, one each for the yaw direction detection and the pitch direction detection, or one sensor that can detect two or three axes at the same time may be disposed. Alternatively, one sensor that can detect six axes with the integrated angular velocity sensor and acceleration sensor may be disposed. The detected angular velocity information is acquired by the blur correction unit 107 and is used for image blur correction of the imaging unit 101. The blur detection unit 104 is also used to detect the rotation of the pan drive unit 102 and the tilt drive unit 103. That is, the blur detection unit 104 also functions as a rotation detection unit.

The image processing unit 105 performs image processing such as noise removal and gamma correction on the electric signal converted by the imaging unit 101, generates image data, and transmits the image data to the system control unit 109. In addition, the image processing unit 105 processes a command received from the system control unit 109. For example, in a case where an instruction from the system control unit 109 to change a zoom position or a focus position is received, the image processing unit 105 drives the imaging unit 101 in such a manner that the focus lens and zoom lens are located at the instructed positions. In a case where an instruction to adjust the image quality is received, the image processing unit 105 adjusts the image quality. The image processing unit 105 also includes therein the pan/tilt control unit 106, the blur correction unit 107, and the position detection sensor control unit 108.

The pan/tilt control unit 106 processes a command related to the pan/tilt control received by the image processing unit 105 from the system control unit 109, controls the drive amount and speed of the pan drive unit 102 and the tilt drive unit 103, and initializes the pan drive unit 102 and the tilt drive unit 103 on the basis of the instruction of the command.

The blur correction unit 107 corrects the blur of the imaging unit 101 on the basis of the blur information acquired from the blur detection unit 104. For the blur correction, an electronic blur correction means that corrects a blur amount by shifting the pixels of an image sensor may be used, or an optical blur correction means that corrects a blur amount by moving the lens of the correction optical system included in the imaging unit 101 may be used. In the present exemplary embodiment, the electronic blur correction means is used.

The position detection sensor control unit 108 controls the energization of the position detection sensors 205 to 208 (position detection unit) described below on the basis of the information acquired from the blur detection unit 104. When the position detection sensors 205 to 208 are energized, a light emitting diode (LED) emits light and thus the output of the position detection sensor can be detected, but when the energization is off, the LED does not emit light and thus the output of the position detection sensor cannot be detected. To detect the position, the position detection sensors 205 to 208 are required to be always energized. However, if the energization is always performed, the light emitting part of the LED deteriorates. Therefore, the energization is controlled to reduce the deterioration. The control method will be described below.

The system control unit 109 controls the entire camera 100. The system control unit 109 distributes the generated image data to the client apparatus (not illustrated) via the communication unit 110.

In addition, the system control unit 109 analyzes a camera control command transmitted from the communication unit 110, and transmits a command related to the image processing unit 105 to the image processing unit 105. For example, in a case where a command to the standby state is received, the system control unit 109 instructs the image processing unit 105 to enter the standby state, and in a case where an instruction command to recover from the standby state, the system control unit 109 instructs the image processing unit 105 to recover from the standby state.

The communication unit 110 receives the camera control command transmitted from the client apparatus and transmits the camera control command to the system control unit 109. In addition, the communication unit 110 transmits a response to the camera control command, to the client apparatus.

The camera 100 in the present exemplary embodiment is not limited to the configuration illustrated in FIG. 1. For example, a video output terminal such as a serial digital interface (SDI) or a high-definition multimedia interface (HDMI) (registered trademark), an audio input/output unit, or an external device input/output unit may be provided in the camera 100. In addition, the communication unit 110 may be connected by wire or wirelessly. Moreover, Instead of being connected to the network 150, the communication unit 110 may be connected to another device by serial communication or the like.

Next, the mechanical configuration of the camera 100 and the abnormality detection using the position detection sensor (position detection unit) according to the present exemplary embodiment will be described with reference to FIGS. 2A and 2B.

Figure 2A:
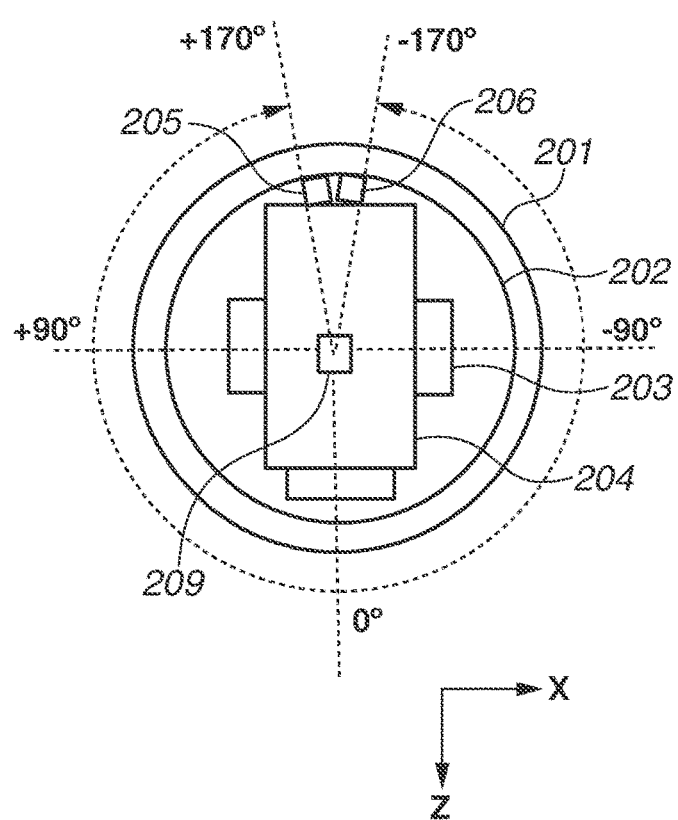
FIGS. 2A and 2B are mechanical configuration diagrams of the pan/tilt camera according to the first exemplary embodiment.
Figure 2B:
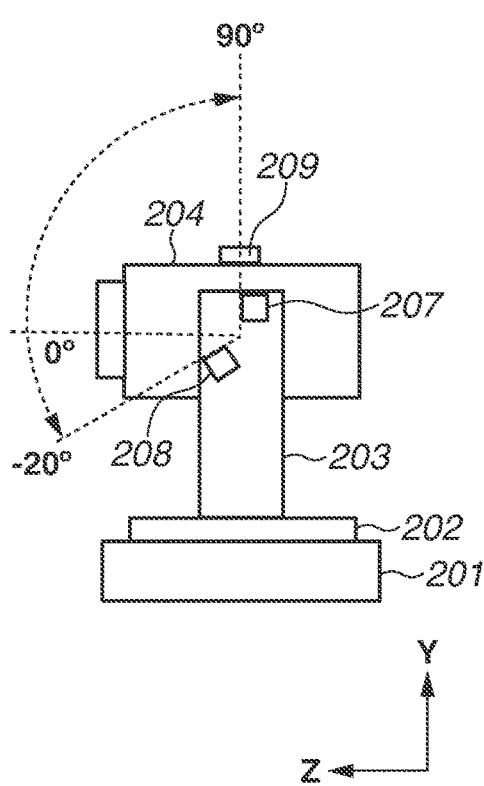

FIG. 2A is a top view of an attached camera 100 and FIG. 2B is a side view of the same. FIGS. 2A and 2B illustrate a bottom case 201, a turntable 202, a camera head support 203, a camera head 204, position detection sensors 205 to 208, and an angular velocity sensor 209. The position detection sensors 205 to 208 and the angular velocity sensor 209 are installed inside the camera 100. Although the sensors cannot be basically seen from the outside as illustrated in FIGS. 2A and 2B, the sensors are illustrated in the appearance for convenience of explanation, which are different from the actual appearance.

With reference to FIGS. 2A and 2B, the operation of the pan/tilt movable unit will be described, by defining the axis in the up-down direction as the vertical axis, and the axis orthogonal to the vertical axis as the horizontal axis.

In FIG. 2A, the clockwise direction is the positive direction of a pan angle and the counterclockwise direction is the negative direction of the pan angle, about the vertical axis orthogonal to the paper surface. In addition, in FIG. 2B, the clockwise direction is the positive direction of a tilt angle, and the counterclockwise direction is the negative direction of the tilt angle, about the axis orthogonal to the paper surface.

In FIG. 2A, the pan drive unit 102 includes the bottom case 201 and the turntable 202, and the turntable 202 turns in the horizontal direction about a vertical axis. The pan drive unit 102 of the present exemplary embodiment can rotate from −170 degrees to +170 degrees in the pan direction as the specification. However, the actual drive limit of the pan drive unit 102 is from −175 degrees to +175 degrees.

The position detection sensors 205 and 206 are installed in the rotating section on the turntable 202. The position detection sensor 205 is installed slightly outside (for example, +171 degrees) of +170 degrees, and the position detection sensor 206 is installed slightly outside of −170 degrees (for example, at −171 degrees).

In the present exemplary embodiment, the position detection sensor includes a transmissive photointerruptor. In the transmissive photointerruptor, a light emitting element and a light receiving element (first member) are disposed so as to face each other. The position of an object is detected by a light-shielding wall (second member) passing between the light emitting element and the light receiving element. The light-shielding wall (second member) (not illustrated) is installed at a fixed section on the bottom case 201 that moves relative to the camera head 204 (rotating body). In addition, when the position detection sensors 205 and 206 rotate to the position of the light-shielding wall, the light-receiving element of the photointerruptor is shielded from light, and the photointerruptor has an output L. If the position detection sensor 205 is not shielded by the light-shielding wall, the light receiving element receives light from the light emitting element, and therefore the output of the photointerruptor is an output H.

In the present exemplary embodiment, the output H and output L are used, but the output value may be an AD-converted value instead of a binary value.

The abnormality detection using the position detection sensors 205 and 206 will be described below. The position detection sensors 205 and 206 are installed outside the normal drive range of −170 degrees to +170 degrees, and therefore, when the motor is driven normally, the motor will not be driven to the positions of the position detection sensors 205 and 206.

However, if the camera head 204 (rotating body) is moved by hand when the camera is at standby or the motor is stopped, the camera head 204 may be moved to the positions of the position detection sensors 205 and 206, and in that case, abnormality detection is performed.

In addition, if the amount moved by hand is too small to reach the positions of the position detection sensors 205 and 206, abnormality cannot be detected, and as a result, the drive will be performed with the position inside the program and the actual position of the camera head 204 being deviated from each other. Therefore, in a case where it is determined that there is still room up to +170 degrees inside the program and the motor is driven, there is a possibility that the actual position does not have room up to +170 degrees and that the motor will be driven beyond +170 degrees.

In that case, when the output of the position detection sensor 205 is detected to change from H to L, the motor is suddenly stopped and the motor drive is stopped. The limit of the drive mechanism of the pan drive unit 102 is +175 degrees. Accordingly, even when the pan drive unit 102 enters +171 degrees which is the position of the position detection sensor 205 at a speed of 100 deg/sec, a collision can be avoided by making a sudden stop. The abnormality detection method using the position detection sensor 206 installed on the other end (minus side) is the same as the abnormality detection method using the position detection sensor 205, and thus the description is omitted.

The angular velocity sensor 209 is installed on the camera head 204 and detects the angular velocity of the camera head 204 (rotating body) in the yaw direction and the pitch direction. In addition, the angular velocity sensor 209 can also detect the angular velocities of the pan drive unit 102 and the tilt drive unit 103.

The X, Y, and Z axes illustrated in FIGS. 2A and 2B indicate the output axes of the angular velocity sensor 209. For example, in a state where the pan angle of FIG. 2A is 0 degree, the angular velocity in the tilt direction can be detected by the X axis of the angular velocity sensor 209, and in a state where the tilt angle in FIG. 2B is 0 degree, the angular velocity in the pan direction can be detected by the Y axis of the angular velocity sensor 209.

As described above, the camera 100 of the present exemplary embodiment can capture an image in a wide range by changing the imaging direction by rotating the camera head in the horizontal direction and the vertical direction. The camera 100 of the present exemplary embodiment is not limited to the configuration illustrated in FIGS. 2A and 2B. For example, the camera 100 may be driven by 360 degrees endlessly in the pan direction. In addition, the camera 100 may also be driven by 180 degrees in the vertical direction. Moreover, the position detection sensors 205 and 206 are installed in the rotating section, but may be installed in the fixed section, and the light-shielding wall may be installed in the rotating section. Furthermore, the position detection sensors 207 and 208 are installed in the fixed section, but may be installed in the rotating section, and the light-shielding wall may be installed on the fixed section.

Hereinafter, the processing of the position detection sensor control unit 108 in the present exemplary embodiment will be described with reference to FIGS. 3 and 4.

Figure 3:
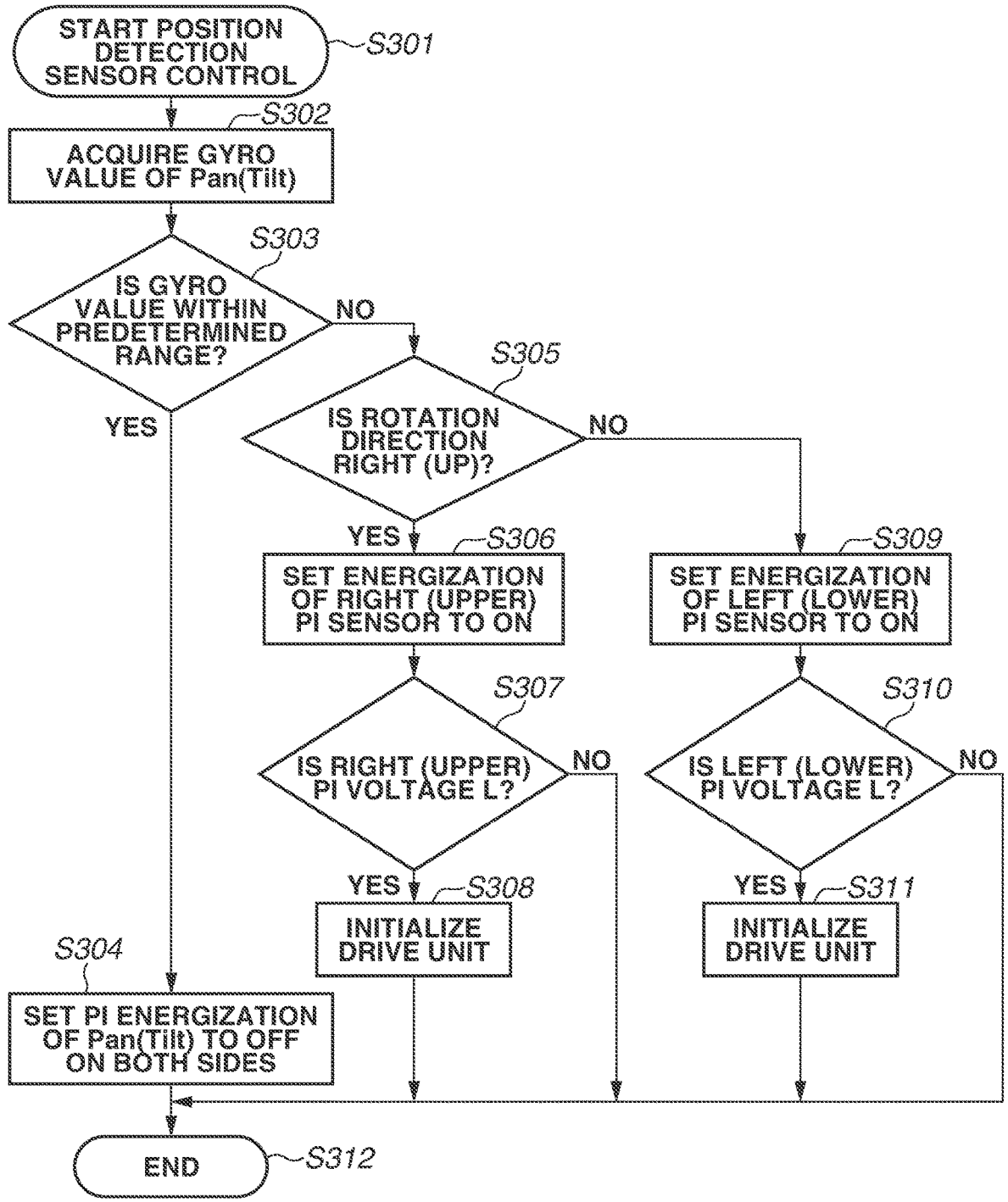
FIG. 3 is a flowchart illustrating the processing of a position detection sensor control unit according to the first exemplary embodiment.

FIG. 3 is a flowchart illustrating the processing of the position detection sensor control unit 108 in the present exemplary embodiment. In FIG. 3, the control of the position detection sensors 205 and 206 in the pan drive unit 102 is mainly described, and the control can be performed in the similar sequence for the position detection sensors 207 and 208 in the tilt drive unit 103. This sequence processing is performed periodically (for example, 60 Hz).

In step S301, the sequence of the position detection sensor control unit 108 according to the present exemplary embodiment is started.

In step S302, in order to detect the rotational state of the pan drive unit 102 (or the tilt drive unit 103), the value of the angular velocity sensor 209 is acquired from the blur detection unit 104. In the present exemplary embodiment, the position detection sensor control unit 108 detects the rotation of the pan drive unit 102 and the tilt drive unit 103 using the value of the blur detection unit 104 used for the blur correction of the imaging unit 101, and controls the energization of the position detection sensors 205 to 208.

Since the angular velocity sensor 209 of the blur detection unit 104 is mounted on the imaging unit 101, when the pan drive unit 102 and the tilt drive unit 103 rotate, the angular velocity sensor 209 also rotates.

The rotation axis of the pan drive unit 102 coincides with the Y axis of the angular velocity sensor 209 when the tilt drive unit 103 is at the 0 degree position, and thus the angular velocity (angular velocity about the Y axis) can be detected from the output of the Y axis of the angular velocity sensor.

In addition, when the tilt drive unit is at the 90 degree position, the Z axis of the angular velocity sensor 209 and the rotation axis coincide with each other, and thus the angular velocity (angular velocity about the Z axis) can be detected from the output of the Z axis of the angular velocity sensor.

Moreover, when the angle of the tilt drive unit is between the 0 degree position and the 90 degree position, the angular velocities of the Y axis and Z axis of the angular velocity sensor 209 are combined on the basis of the angle of the tilt drive unit 103 to calculate the angular velocity of the pan drive unit 102. The angular velocity of the pan drive unit 102 can be expressed by the following formula (1), $$\omega p = \omega y^* \cos \theta t + \omega z^* \sin \theta t \quad (1),$$

where the angular velocity of the pan drive unit 102 is ωp, the angular velocity in the Y axis direction is ωy, the angular velocity in the Z axis direction is ωz, and the tilt angle is ωt.

The rotation axis of the tilt drive unit 103 always coincides with the X axis of the angular velocity sensor 209, and therefore the angular velocity can be obtained from the output of the X axis of the angular velocity sensor 209.

In step S303, it is determined whether the value of the angular velocity acquired in step S302 is within a predetermined range. This determination is performed to determine whether the pan drive unit 102 or the tilt drive unit 103 is rotating or stopped based on the value of the angular velocity.

Figure 4:
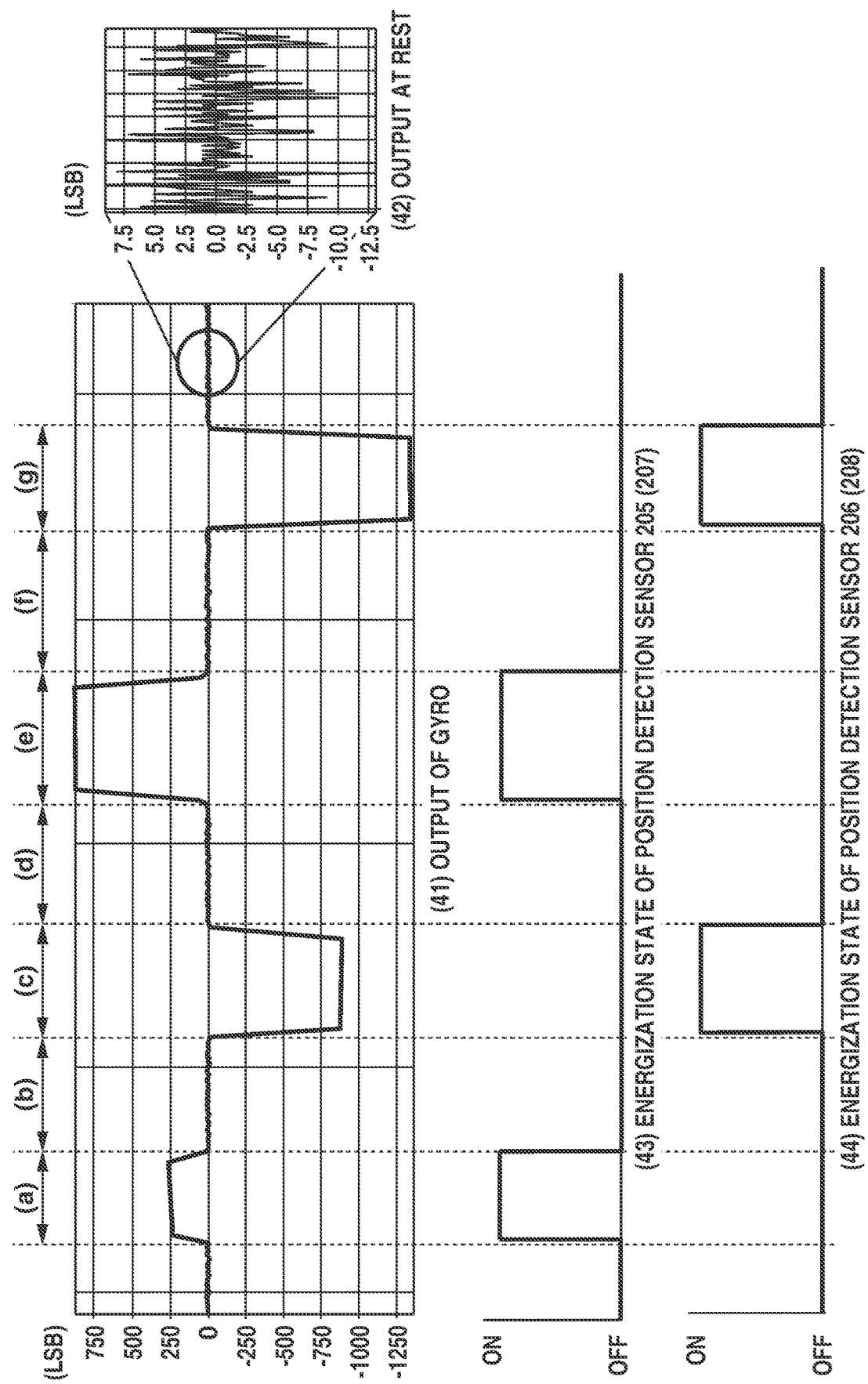
FIG. 4 is a diagram illustrating the relation between the output of a blur detection unit and the energization state of a position detection sensor according to the first exemplary embodiment.

FIG. 4 is a diagram illustrating the relation between the output of the angular velocity sensor 209 and the energization state of the position detection sensor 205 (or position detection sensor 207) and the position detection sensor 206 (or position detection sensor 208).

A reference numeral (41) indicates the output of the angular velocity sensor 209. The horizontal axis is the time and the vertical axis is the output value of the angular velocity sensor 209.

In sections (a) and (e) of FIG. 4, the output of the angular velocity sensor 209 is a positive value, which indicates that the pan drive unit 102 (or the tilt drive unit 103) is rotated in the + direction.

In sections (c) and (g) of FIG. 4, the output of the angular velocity sensor 209 is a negative value, which indicates that the pan drive unit 102 (or the tilt drive unit 103) is rotated in the − direction.

Sections (b), (d), and (f) of FIG. 4 indicate that the output of the angular velocity sensor 209 is near 0 and the pan drive unit 102 (or the tilt drive unit 103) is at rest (not moved even by hand). In addition, the enlarged graph of the output of the angular velocity sensor 209 at rest is shown in FIG. 4 (42). The angular velocity sensor 209 does not always output 0 at rest, but outputs a value near 0 as illustrated in FIG. 4 (42) in the range of ±10 least significant bit (LSB). Therefore, in order to determine whether the pan drive unit 102 (or the tilt drive unit 103) is rotating or stopped, if the output is within ±20 LSB for example, it is determined that the pan drive unit 102 (or the tilt drive unit 103) is at rest.

Referring back to FIG. 3, in step S303, if the output value of the angular velocity sensor 209 is within ±20 LSB (less than a predetermined value), it is determined that the pan drive unit 102 (or the tilt drive unit 103) is at rest and the processing proceeds to step S304. On the other hand, if the output value is not in the range of ±20 LSB (more than or equal to the predetermined value), it is determined that the pan drive unit 102 (or the tilt drive unit 103) is rotating and the processing proceeds to step S305.

In step S304, the energization of the position detection sensors 205 and 206 (or the position detection sensors 207 and 208) is set to OFF. This is because the pan drive unit 102 or the tilt drive unit 103 is stopped, and thus it is not necessary to detect the position. Here, when the pan drive unit 102 or the tilt drive unit 103 is stopped, the entire camera 100 is not moved even manually.

In step S305, since the pan drive unit 102 (or the tilt drive unit 103) is in a rotated state (a state of being motor-driven or moved by hand), the rotation direction is determined (direction determination). The rotation direction can be determined from the sign of the output of the angular velocity sensor 209.

The system control unit 109 (direction determination unit) determines that the pan drive unit 102 (or the tilt drive unit 103) is rotating to the right (or upward) if the output of the angular velocity sensor 209 is a positive value. On the other hand, the system control unit 109 (direction determination unit) determines that the pan drive unit 102 (or the tilt drive unit 103) is rotating to the left (or downward) if the output of the angular velocity sensor 209 is a negative value. If it is determined that the pan drive unit 102 (or the tilt drive unit 103) is rotating to the right (or upward), the processing proceeds to step S306, and if it is determined that the pan drive unit 102 (or the tilt drive unit 103) is rotating to the left (or downward), the processing proceeds to step S309.

In step S306, since the pan drive unit 102 is rotating to the right (or the tilt drive unit 103 is rotating upward), the energization of the position detection sensor 205 (or position detection sensor 207) is set to ON. In this case, the rotation direction is the direction in which a photointerruptor (first member) provided on the turntable 202 supporting the camera head 204 and a light-shielding wall (second member) provided on the bottom case 201 (fixed section) approach each other. By setting the energization of the position detection sensor to ON, the light emitting element of the position detection sensor emits light and the position can be detected. In FIG. 4, sections (a) and (e) represent the state of rotating to the right (or upward), and therefore, after detecting the rotation, the energization of the position detection sensor 205 installed in the right direction (or the position detection sensor 207 installed in the upward direction) is set to ON.

On the other hand, the position detection sensor 206 (or position detection sensor 208) installed at a position opposite to the rotation direction is not energized. In this case, for the position detection sensor 206 (or the position detection sensor 208), the rotation direction is the direction in which the photointerruptor (first member) and the light-shielding wall (second member) provided on the bottom case 201 (fixed section) are separated from each other.

After setting the energization of the position detection sensor 205 (or the position detection sensor 207) to ON, the processing proceeds to step S307.

In step S307, it is determined whether the voltage of the light receiving part of the position detection sensor 205 (or position detection sensor 206) is L level. When the rotation position of the pan drive unit 102 (or the tilt drive unit 103) is at 171 degrees or 91 degrees, the light emitted from the light emitting part of the position detection sensor 205 is shielded by the light-shielding wall, and thus the voltage of the light receiving part is L level. On the other hand, when the light is not shielded by the light-shielding wall, the voltage of the light receiving part is H level. If the voltage level of the light receiving part is determined to be L level, the processing proceeds to step S308, and if the voltage level of the light receiving part is determined to be H level, the processing proceeds to step S312.

In step S308, the voltage of the position detection sensor is determined to be L level and in an abnormal state, and thus the drive unit is initialized. The abnormal state is a state where the pan drive unit 102 or the tilt drive unit 103 is rotated by hand or the like. In this state, the position inside the program and the actual position of the drive unit are deviated from each other, and an accurate control cannot be performed. Therefore, the drive unit is initialized so that an accurate control can be performed again.

To initialize the pan drive unit 102, first, the position detection sensor 205 is energized, the pan drive unit 102 is driven in the plus direction, and when it is detected that the output of the position detection sensor 205 changes from H to L, the pan drive unit 102 is stopped and the current position is stored as a reference position. The position detection sensor 205 is installed to output the output L at the position of +171 degrees. Therefore, the position detection sensor 205 can be stopped at the 0 degree position by rotating by 171 degrees in the minus direction and stopping thereat.

To initialize the tilt drive unit 103, first, the position detection sensor 208 is energized, the tilt drive unit 103 is driven in the minus direction, and when it is detected that the output of the position detection sensor 208 changes from H to L, the tilt drive unit 103 is stopped and the current position is stored as a reference position. The position detection sensor 208 is installed to output the output L at the position of −21 degrees. Therefore, the position detection sensor 208 can be stopped at the 0 degree position by rotating by 21 degrees in the plus direction and stopping thereat.

The pan drive unit 102 and the tilt drive unit 103 may be initialized individually or simultaneously. In the present exemplary embodiment, the initializations are performed simultaneously. In addition, in the present exemplary embodiment, the position detection sensor 205 is used for the initialization operation of the pan drive unit 102, however, the position detection sensor 206 may be used instead. Moreover, the position detection sensor 208 is used for the initialization operation of the tilt drive unit 103, however, the position detection sensor 207 may be used therefor. When the initialization process ends, the processing proceeds to step S312.

In step S309, the pan drive unit 102 is rotating to the left (or the tilt drive unit 103 is rotating downward), and thus the energization of the position detection sensor 206 (or position detection sensor 208) is set to ON. By setting the energization of the position detection sensor to ON, the light emitting element of the position detection sensor emits light and the position can be detected. In FIG. 4, sections (c) and (g) represent the state of rotating to the left (or downward), and therefore, after detecting the rotation, the energization of the position detection sensor 206 installed in the left direction (or the position detection sensor 208 installed in the downward direction) is set to ON. Since the pan drive unit 102 is rotating to the left (or the tilt drive unit 103 is rotating downward), the position detection sensor 205 (or position detection sensor 207) installed at the position opposite to the rotation direction is not energized. After setting the energization of the position detection sensor 206 (or position detection sensor 208) to ON, the processing proceeds to step S310.

In step S310 it is determined whether the voltage of the light receiving part of the position detection sensor 206 (or position detection sensor 208) is L level. When the rotation position of the pan drive unit 102 (or the tilt drive unit 103) is at −171 or −21 degrees, the light emitted from the light emitting part of the position detection sensor 205 is shielded by the light-shielding wall, and thus the voltage of the light receiving part is L level. On the other hand, when the light is not shielded by the light-shielding wall, the voltage of the light receiving part is H level. If the voltage level of the light receiving part is determined to be L level, the processing proceeds to step S311, and if the voltage level of the light receiving part is determined to be H level, the processing proceeds to step S312.

In step S311, the voltage level is determined to be in an abnormal state, and thus the drive unit is initialized. The initialization process is the same as S308, and therefore the description is omitted. When the initialization process ends, the processing proceeds to step S312.

In step S312, the sequence of the position detection sensor control unit 108 according to the present exemplary embodiment is ended.

As described above, in the present exemplary embodiment, the processing of the position detection sensor control unit 108 is performed using the value of the angular velocity sensor 209 of the blur detection unit 104, and if the value of the angular velocity sensor 209 is less than a predetermined value, the energization of the position detection sensors 205 to 208 is set to OFF. Furthermore, if the value is more than or equal to the predetermined value, the energization is set to ON for the position detection sensor in the rotation direction side on the basis of the rotation direction that can be detected by the angular velocity sensor 209. Since the energization is based on the value of the angular velocity sensor that can detect the rotation of the pan drive unit 102 and the tilt drive unit 103, not only when the motor is driven, but also when the pan drive unit 102 or the tilt drive unit 103 is rotated due to mischief or the like when the motor is stopped, movement can be detected and abnormality can be detected. In addition, since the position detection sensor in the direction opposite to the rotation direction of the pan drive unit 102 and the tilt drive unit 103 is not energized, the energization time can be shortened and the deterioration of the position detection sensor can be reduced.

A second exemplary embodiment will be described. For the same components as the components in the first exemplary embodiment, the same reference numerals will be used. For the same components, detailed description will be omitted. The differences from the first exemplary embodiment will be mainly described.

Figure 5:
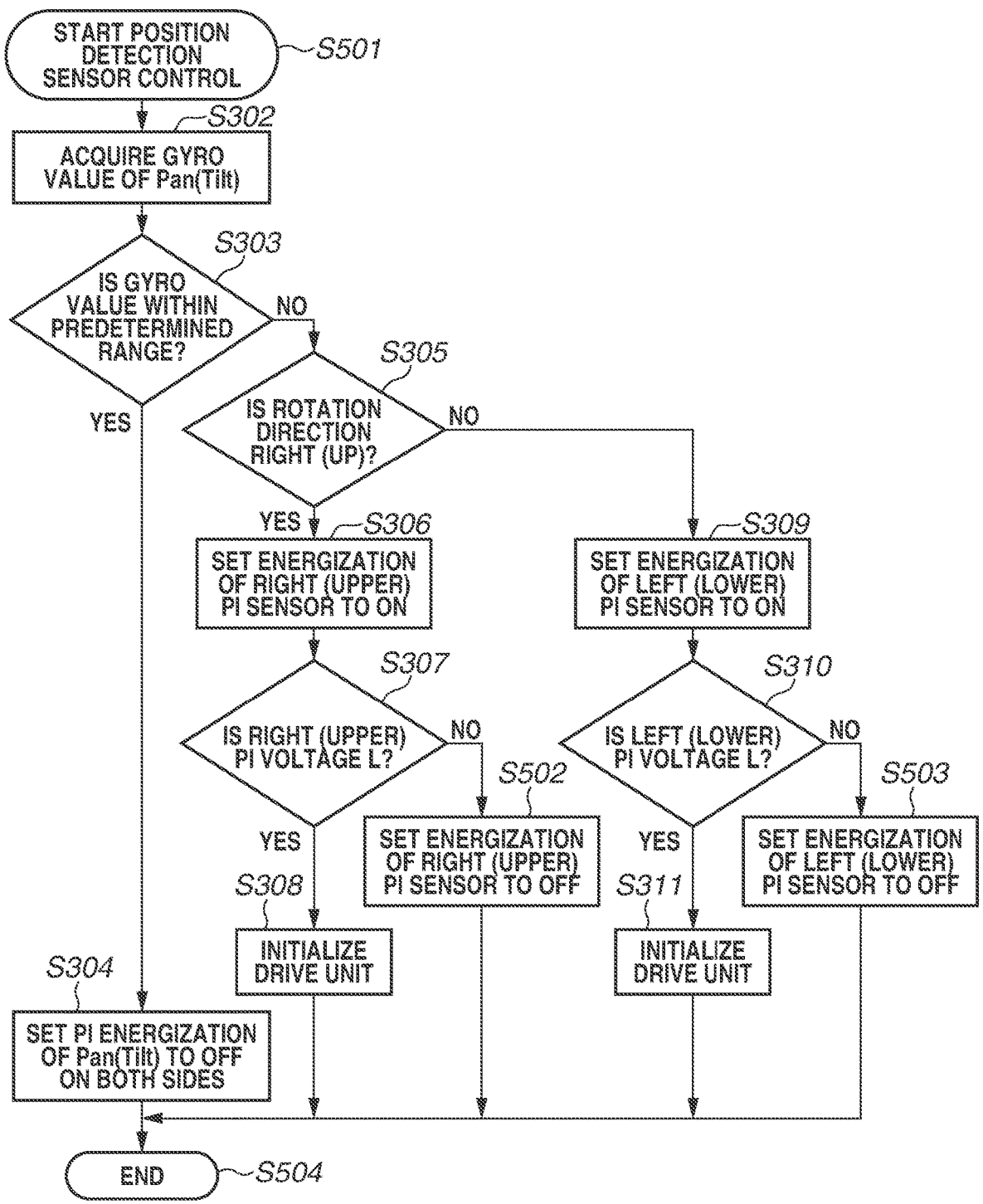
FIG. 5 is a flowchart illustrating the processing of a position detection sensor control unit according to a second exemplary embodiment.
Figure 6:
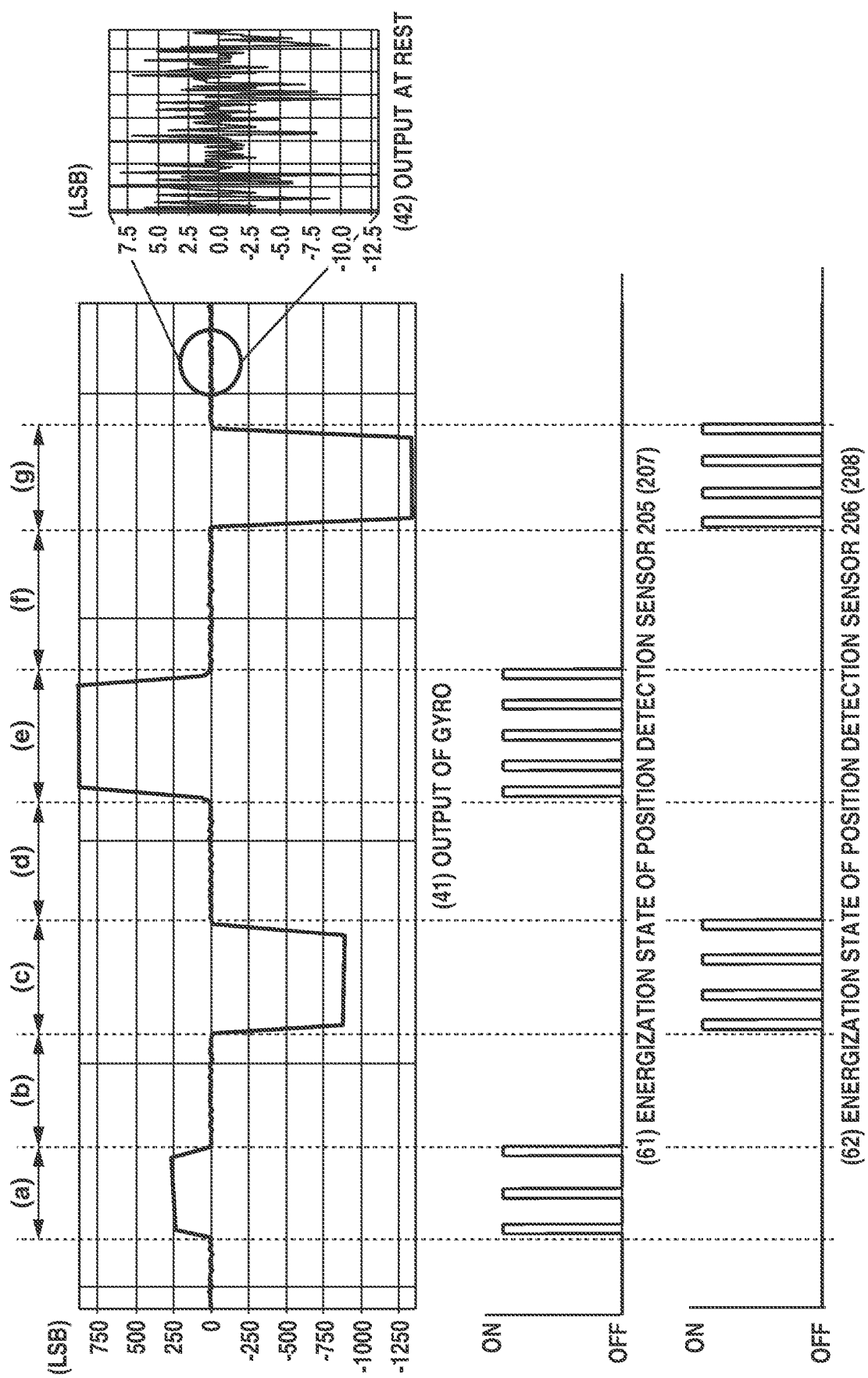
FIG. 6 is a diagram illustrating the relation between the output of a blur detection unit and the energization state of a position detection sensor according to the second exemplary embodiment.

FIG. 5 is a sequence diagram of the position detection sensor control unit 108 in the present exemplary embodiment. FIG. 6 is a diagram illustrating the relation between the output of the angular velocity sensor 209 and the energization state of the position detection sensors 205 and 206 (or the position detection sensors 207 and 208).

In the first exemplary embodiment, the position detection sensor in the rotation direction is always energized on the basis of the output of the angular velocity sensor 209 while the pan drive unit 102 or the tilt drive unit 103 is rotating. However, in the present exemplary embodiment, the position detection sensor is not always energized even when the pan drive unit 102 or the tilt drive unit 103 is rotating, but is intermittently energized.

The sequence of the position detection sensor control unit 108 of the present exemplary embodiment will be described with reference to FIG. 5. The same steps as in FIG. 3 are denoted by the same step number as in FIG. 3, and the description is omitted.

In step S501, the control sequence of the position detection sensor control unit 108 according to the present exemplary embodiment is started.

In step S502, it is determined in step S307 that the current rotation position is not abnormal, and thus the energization of the position detection sensor 205 (or position detection sensor 207) is set to OFF. After setting the energization to OFF, the processing proceeds to S504.

In step S503, it is determined in step S310 that the current rotation position is not abnormal, and thus the energization of the position detection sensor 206 (or position detection sensor 208) is set to OFF. After setting the energization to OFF, the processing proceeds to S504.

In step S504, the sequence processing of the position detection sensor control unit 108 according to the present exemplary embodiment is ended.

The sequence processing of the position detection sensor control unit 108 is performed periodically (for example, 60 Hz) as in the first exemplary embodiment. Accordingly, by carrying out the flowchart illustrated in FIG. 5, as illustrated in FIG. 6, the energization state of the position detection sensors 205 to 208 is intermittent even when the pan drive unit 102 and the tilt drive unit 103 continue to rotate. For example, the energization state of the position detection sensor 205 (207) repeats ON and OFF three times in section (a) and five times in section (e) illustrated in FIG. 6. In addition, the energization state of the position detection sensor 206 (208) repeats ON and OFF four times in section (c) and four times in section (g) illustrated in FIG. 6. By intermittently energizing in this way, the energization time for the position detection sensors 205 to 208 is further shortened, and deterioration can be further reduced.

As described above, in the second exemplary embodiment, after the energization of the position detection sensor in the rotation direction side is set to ON and the position is detected, if it is determined that there is no abnormality, the energization of the position detection sensor is set to OFF. Therefore, in the energization of the position detection sensors 205 to 208, it is possible not only not to energize the position detection sensor in the direction opposite to the rotation direction, but also to intermittently energize the position detection sensor in the rotation direction. In addition, the energization time for the position detection sensor can be shortened and deterioration can be prevented.

In a third exemplary embodiment, the control period (frequency) of the intermittent energization of the position detection sensors 205 to 208 in the second exemplary embodiment is changed in accordance with the rotation speeds of the pan drive unit 102 and the tilt drive unit 103. For the same components as the components in the first and second exemplary embodiments, the same numerals are used. In addition, for the same components, detailed description is omitted, and the differences from the second exemplary embodiment will be mainly described.

Figure 7:
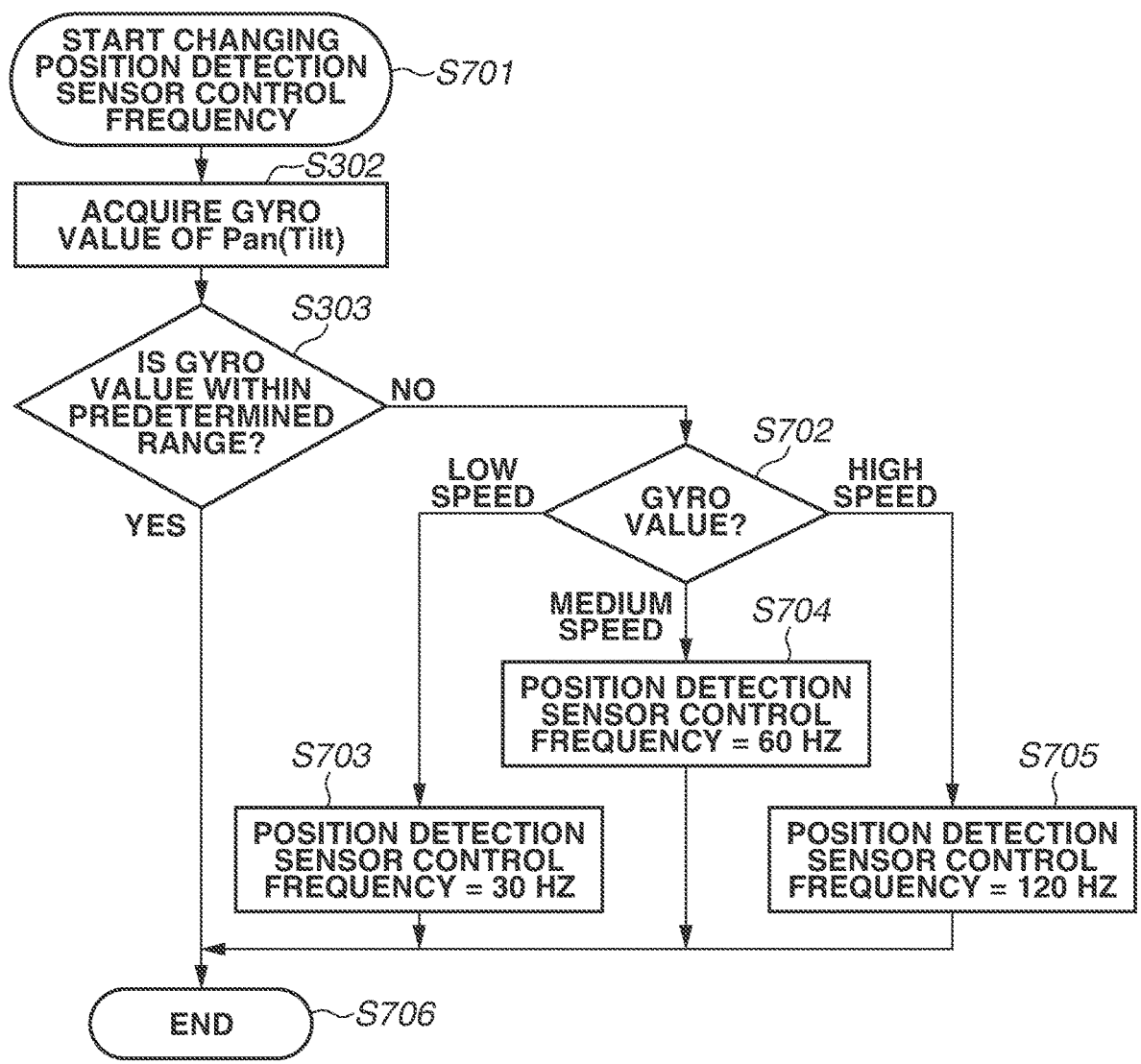
FIG. 7 is a flowchart illustrating the frequency changing process of the position detection sensor control unit according to the second exemplary embodiment.
Figure 8:
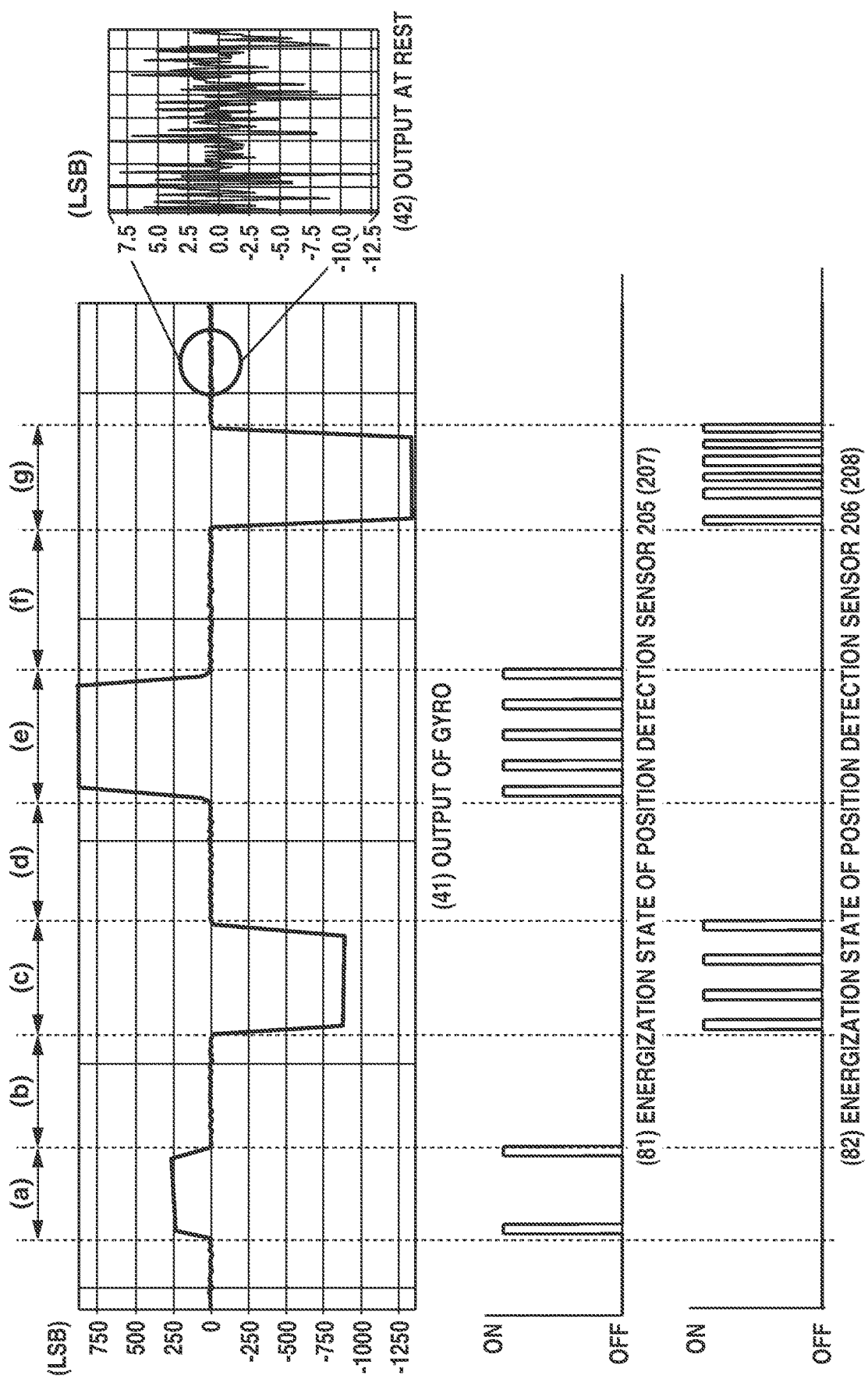
FIG. 8 is a diagram illustrating the relation between the output of a blur detection unit and the energization state of a position detection sensor according to a third exemplary embodiment.

FIG. 7 is a sequence diagram for changing the control period of the position detection sensor control unit 108 in the present exemplary embodiment. FIG. 8 is a diagram illustrating the relation between the output of the angular velocity sensor 209 and the energization state of the position detection sensors 205 and 206 (or the position detection sensors 207 and 208). The control period of the position detection sensor control unit 108 is set to 60 Hz in the first and second exemplary embodiments, however, in the present exemplary embodiment, the control period (frequency) is changed.

Hereinafter, the description will be made with reference to FIG. 7. In step S701, the period (frequency) change sequence of the position detection sensor control unit 108 according to the present exemplary embodiment is started.

In step S702, it is determined whether the output of the angular velocity sensor 209 acquired in step S302 is a low speed, a medium speed, or a high speed. Since it is already determined in step S303 if the pan drive unit 102 or the tilt drive unit 103 is stopped or rotating, in step S702, the pan drive unit 102 or the tilt drive unit 103 is in a rotating state.

In this step, the speed is determined to be one of three stages from the value of the angular velocity sensor 209. For example, if the output of the angular velocity sensor 209 is less than ±500 LSB, the speed is determined to be a low speed; if 500 LSB or more and less than 1000 LSB (or larger than −1000 LSB and −500 LSB or less), the speed is determined to be a medium speed; and if 1000 LSB or more (or −1000 LSB or less), the speed is determined to be a high speed.

In the gyro output illustrated in FIG. 8, a low speed is illustrated in section (a), a medium speed is illustrated in sections (c) and (e), and a high speed is illustrated in section (g).

Referring back to FIG. 7, if the speed is determined to be a low speed, the processing proceeds to step S703, if the speed is determined to be a medium speed, the processing proceeds to step S704, and if the speed is determined to be a high speed, the processing proceeds to step S705.

In step S703, since the pan drive unit 102 or the tilt drive unit 103 is determined to be moving at a low speed, the control frequency of the position detection sensor control unit 108 (call period of step S501) is set to 30 Hz. For example, it takes 5 seconds to rotate once when the rotation speed is 0.2 deg/sec. In addition, it takes 1 second to rotate once when the rotation speed is 1 deg/sec. Moreover, it takes 0.01 seconds to rotate once when the rotation speed is 100 deg/sec. In this way, the rotation time differs depending on the speed even when the rotation amount is the same, which means that, at low speeds, even when the control frequency is lowered to shorten the position detection period, it is unlikely that the drive unit will be driven to the drive limit and collide. By setting the control frequency low, the energization time for the position detection sensors 205 to 208 can be further shortened, and deterioration can be further reduced.

In section (a) illustrated in FIG. 8, the position detection sensor 205 (or the position detection sensor 207) is energized twice, which is less than the number of times of energization of three times in section (a) illustrated in FIG. 6. The energization time is also shortened. After setting the control frequency to 30 Hz, the processing proceeds to step S706 in FIG. 7.

In step S704, since the pan drive unit 102 or the tilt drive unit 103 is determined to be moving at a medium speed, the control frequency (call period of S501) of the position detection sensor control unit 108 is set to 60 Hz. In sections (c) and (e) illustrated in FIG. 8, the control frequency is the same as in sections (c) and (e) illustrated in FIG. 6. After setting the control frequency to 60 Hz, the processing proceeds to step S706 in FIG. 7.

In step S705, since the pan drive unit 102 or the tilt drive unit 103 is determined to be moving at a high speed, the control frequency (call period of S501) of the position detection sensor control unit 108 is set to 120 Hz. The reason for increasing the control frequency at high speeds is to shorten the position detection period and further reduce the possibility of collision by driving to the drive limit of the drive unit, since at high speeds, the rotation time is shorter. In section (g) illustrated in FIG. 8, in the section determined to be a high speed, the control is performed at a control frequency higher than in section (g) illustrated in FIG. 6, and the number of times of energization is also increased. In other words, since the number of position detections is increased, the possibility of collision due to driving to the driving limit is reduced. After setting the control frequency to 120 Hz, the processing proceeds to step S706 in FIG. 7.

In step S706, the frequency (period) change sequence of the position detection sensor control unit 108 according to the present exemplary embodiment is ended.

As described above, in the third exemplary embodiment, the control frequency (period) of the position detection sensor control unit 108 is changed in accordance with the output of the angular velocity sensor 209. Therefore, when the pan drive unit 102 or the tilt drive unit 103 is rotating at a low speed, the number of times the position detection sensor is energized (that is, the energization time) can be reduced by lowering the control frequency, and the deterioration of the position detection sensor can be further reduced. In addition, when the pan drive unit 102 or the tilt drive unit 103 is rotating at a high speed, the number of times of detecting abnormal positions can be increased by increasing the control frequency, and the possibility of collision by driving to the drive limit can be further reduced.

Moreover, in the present exemplary embodiment, the value of the angular velocity sensor 209 is classified into three stages in step S702 of FIG. 7, but this is not a limitation. For example, the value may be classified in more stages, for example into five stages, instead of three stages.

Furthermore, the third exemplary embodiment and the first exemplary embodiment may be combined. That is, the energization of the photointerruptor (PI) sensor in step S306 or step 309 of FIG. 3 can be intermittently controlled, and the control frequency can be determined in accordance with the rotation speed of the pan drive unit 102 or the tilt drive unit 103.

In a fourth exemplary embodiment, the control period of the position detection sensor control unit 108 in the third exemplary embodiment is changed in accordance with the drive mode of the camera 100, instead of the rotation speed of the pan drive unit 102 and the tilt drive unit 103.

Figure 9:
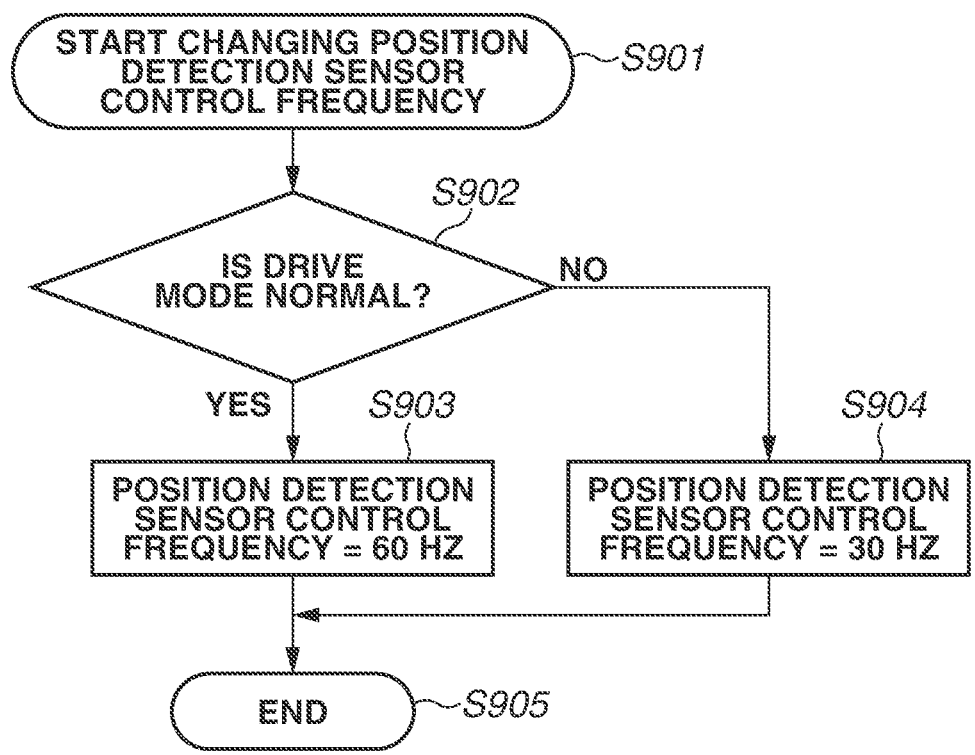
FIG. 9 is a flowchart illustrating the frequency changing process of a position detection sensor control unit according to a fourth exemplary embodiment.

FIG. 9 is a flowchart for changing the control period of the position detection sensor control unit 108 in the present exemplary embodiment. This sequence processing is called when the drive mode is changed.

In step S901, the period change sequence of the position detection sensor control unit 108 according to the present exemplary embodiment is started.

In step S902, the drive mode of the camera 100 is acquired. In the present exemplary embodiment, the drive mode includes a normal mode (normal state) and a standby mode (standby state). The normal mode is a state where an image can always be acquired. The standby mode is a state where the power supply of the imaging unit 101 is cut off to save energy and images cannot be acquired (imaging by the imaging unit 101 is restricted). In the normal mode, the pan/tilt control unit 106 receives a command from the communication unit 110 and drives the pan drive unit 102 and the tilt drive unit 103, but in the standby mode, the pan/tilt control unit 106 does not drive the pan drive unit 102 and the tilt drive unit 103. Although not driven by the pan/tilt control unit 106, there is a possibility that the pan drive unit 102 or the tilt drive unit 103 may be manually rotated due to mischief or the like even in the standby mode. Therefore, the position detection sensors 205 to 208 are energized to allow position detection in such a manner that the abnormality of the pan drive unit 102 or the tilt drive unit 103 can be detected when the pan drive unit 102 or the tilt drive unit 103 is rotated by hand. In step S902, if the drive mode is determined to be the normal mode, the processing proceeds to step S903, and if the drive mode is determined to be the standby mode, the processing proceeds to step S904.

In step S903, since the drive mode is the normal mode, the control period of the position detection sensor control unit 108 (call period of S501) is set to 60 Hz. After setting the control period to 60 Hz, the processing proceeds to step S905.

In step S904, since the drive mode is the standby mode, the control period of the position detection sensor control unit 108 (call period of step S501) is set to 30 Hz. In the case of the standby mode, the reason why the control period is set lower than the normal mode is that the maximum speed of manual rotation is considered to be lower than the maximum speed controlled by the pan/tilt control unit 106. After setting the control period to 30 Hz, the processing proceeds to step S905.

In step S905, the period change sequence of the position detection sensor control unit 108 according to the present exemplary embodiment is ended.

As described above, in the fourth exemplary embodiment, the control period of the position detection sensor control unit 108 is changed in accordance with the drive mode of the camera 100. Therefore, in the standby mode, the number of times of energization (that is, the energization time) can be reduced by lowering the control period, and the deterioration of the position detection sensors 205 to 208 can be reduced.

Furthermore, in the present exemplary embodiment, the control period is changed in accordance with the drive mode of the camera 100, but may be combined with the third exemplary embodiment. That is, the control period of the position detection sensor control unit 108 may be changed in accordance with the information about both the drive mode and the rotation speed of the pan drive unit 102 or the tilt drive unit 103.

In a fifth exemplary embodiment, a rotation detection unit 1001 is used as a means for detecting the rotation in the first to fourth exemplary embodiments instead of the blur detection unit 104.

Figure 10:
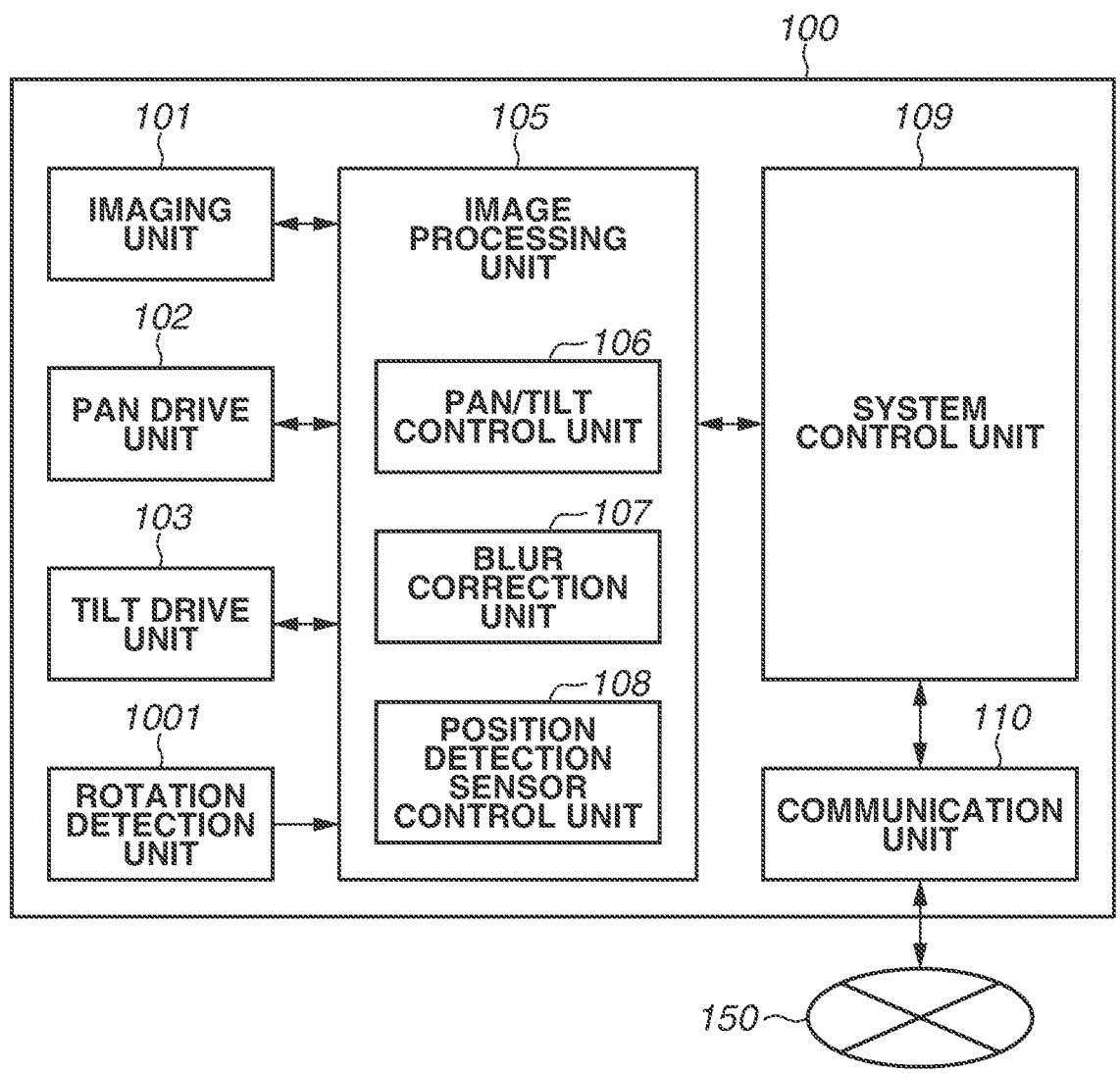
FIG. 10 is a functional block diagram of a pan/tilt camera according to a fifth exemplary embodiment of the disclosure.

FIG. 10 illustrates a functional block diagram of a pan/tilt camera in the present exemplary embodiment. The same components as the components in FIG. 1 are denoted by the same reference numerals as the reference numerals in FIG. 1, and the description thereof will be omitted.

The rotation detection unit 1001 is an encoder for detecting the rotation amount of the pan drive unit 102 and the tilt drive unit 103. The encoder outputs a two-phase pulse in accordance with the rotation amount, and can detect a rotation amount and a rotation direction by receiving the two-phase pulse. Encoders are installed in the pan drive unit 102 and the tilt drive unit 103, respectively.

Figure 11:
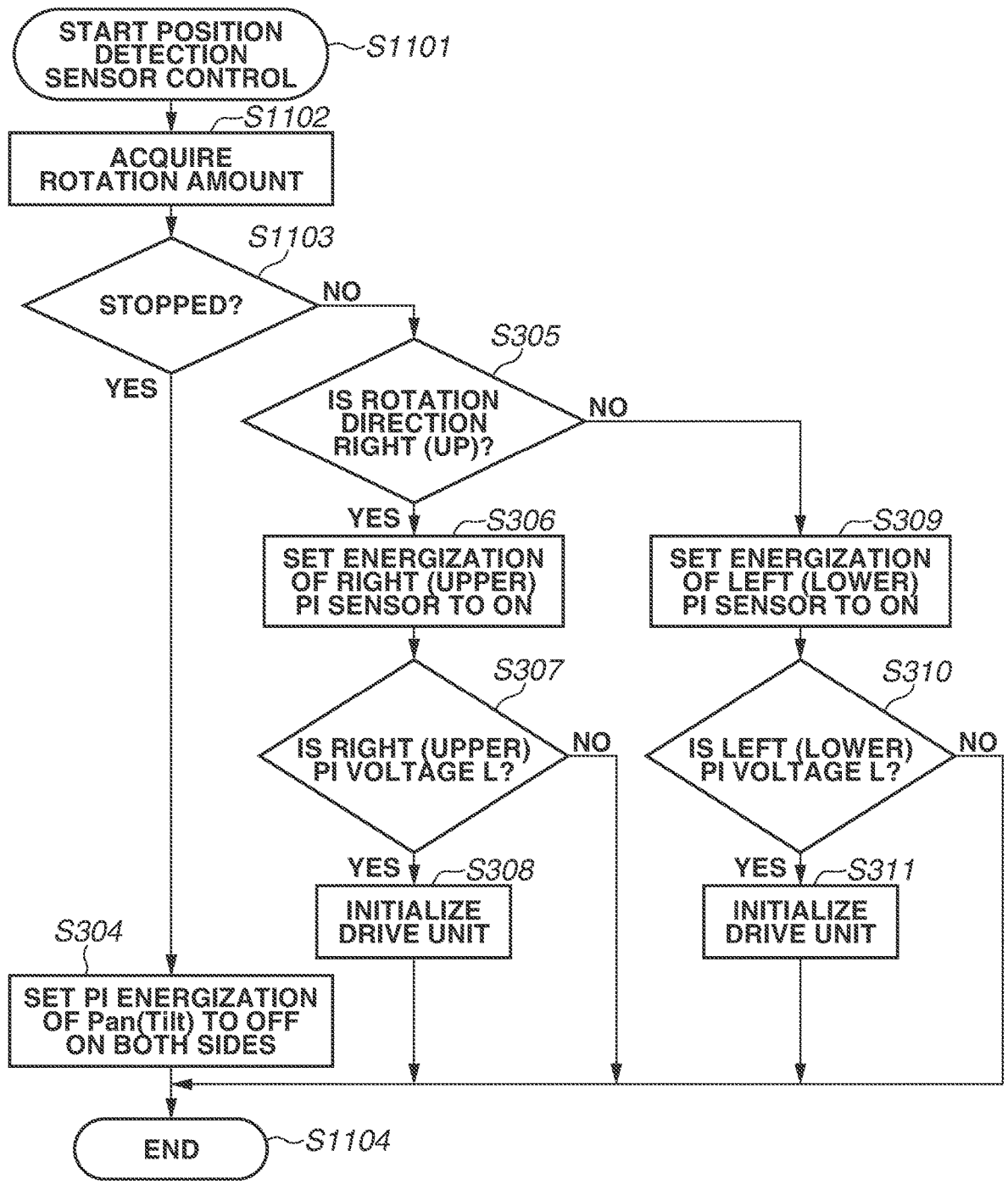
FIG. 11 is a flowchart illustrating the processing of a position detection sensor control unit according to the fifth exemplary embodiment of the disclosure.

Next, the sequence processing of the position detection sensor control unit 108 in the present exemplary embodiment will be described with reference to FIG. 11. The same steps as the steps in FIG. 3 are denoted by the same step number as the step number in FIG. 3, and the description is omitted.

In step S1101, the processing of the position detection sensor control unit 108 according to the present exemplary embodiment is started.

In step S1102, the rotation amount indicating whether the pan drive unit 102 or the tilt drive unit 103 is rotating or stopped is acquired from the rotation detection unit 1001, and the rotation direction is acquired if the pan drive unit 102 or the tilt drive unit 103 is rotating. After acquiring the rotation amount, the processing proceeds to step S1103.

In step S1103, it is determined, from the information acquired in step S1102, whether the pan drive unit 102 and the tilt drive unit 103 are stopped. If it is determined from the acquired rotation amount that the pan drive unit 102 and the tilt drive unit 103 are stopped, the processing proceeds to step S304, and if it is determined that the pan drive unit 102 and the tilt drive unit 103 are rotating, the processing proceeds to step S305.

In step S1104, the processing of the position detection sensor control unit 108 according to the present exemplary embodiment is ended.

As described above, in the fifth exemplary embodiment, the rotation detection unit 1001 is used instead of the blur detection unit 104 (angular velocity sensor 209) used in the first to fourth exemplary embodiments. In the present exemplary embodiment, the configuration has been described in which the blur detection unit 104 of the first exemplary embodiment is replaced with the rotation detection unit 1001. It is to be noted that the second to fourth exemplary embodiments may also be carried out by similarly replacing the blur detection unit 104 with the rotation detection unit 1001.

A program (software) that implements the functions of the embodiments in which a part or all of the control in the disclosure is described may be supplied to an imaging apparatus or an information processing apparatus via a network or various storage media. A computer (or a central processing unit (CPU), a micro processing unit (MPU), etc.) in the imaging apparatus or information processing apparatus may read and execute the program. In that case, the program and the storage medium that stores the program is included the disclosure.

Figure 12:
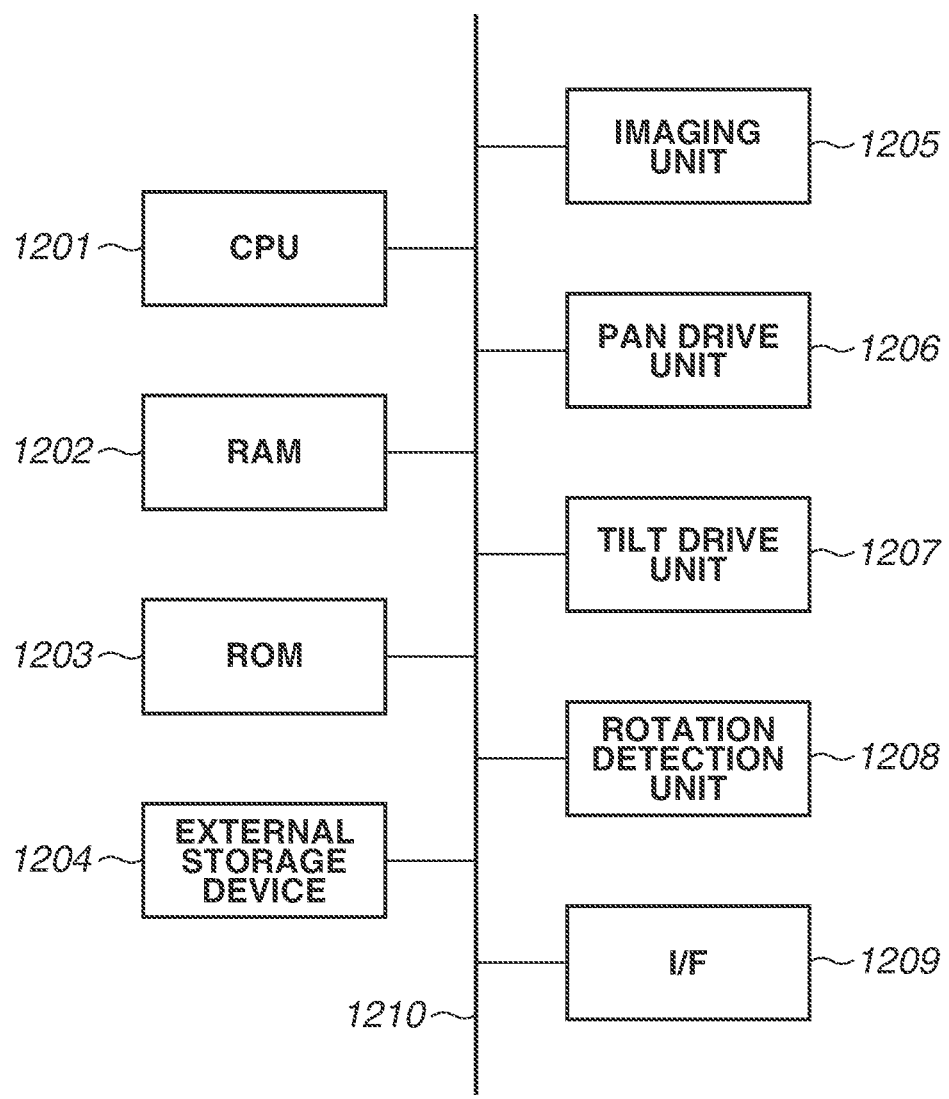
FIG. 12 is a diagram illustrating the hardware configuration of a control apparatus according to each exemplary embodiment.

FIG. 12 is a block diagram illustrating a configuration example of the hardware of the camera 100 that executes the processing according to each of the above embodiments as a program.

A CPU 1201 controls the entire camera 100 by using the computer program and data stored in a random access memory (RAM) 1202 and a read only memory (ROM) 1203, and executes processing according to each of the above embodiments. The CPU 1201 controls an imaging unit 1205, a pan drive unit 1206, a tilt drive unit 1207, and a rotation detection unit 1208.

The RAM 1202 includes an area for temporarily storing programs and data loaded from an external storage device 1204, data acquired from the outside via an interface (I/F) 1209, and the like. Further, the RAM 1202 includes a work area used by the CPU 1201 to perform various processing. That is, the RAM 1202 can be allocated as a frame memory, for example, or can provide various other areas as appropriate.

The ROM 1203 stores the setting data of the camera 100, a boot program, and the like.

The imaging unit 1205 can include an imaging element such as a charge-coupled device (CCD) or a complementary metal-oxide semiconductor (CMOS) sensor. An image signal is generated by photoelectric conversion of a subject image captured by an imaging optical system (not illustrated).

The external storage device 1204 is an external storage device such as a universal serial bus (USB) memory and a Secure Digital (SD) card. The external storage device 1204 stores a computer program for causing the CPU 1201 to implement the processing according to each of the above embodiments. Furthermore, each image to be processed may be stored in the external storage device 1204.

The computer program and data stored in the external storage device 1204 are appropriately loaded into the RAM 1202 in accordance with the control by the CPU 1201 and are processed by the CPU 1201. The I/F 1209 can be connected to a network such as a local area network (LAN) and the Internet, and other devices such as projection devices and display devices, and a computer can acquire and send various information via this I/F 1209. A bus 1210 connects each of the above components.

While the exemplary embodiments of the disclosure have been described above, the disclosure is not limited to these embodiments, and various modifications and changes can be made within the scope of the gist of the disclosure. For example, a sensor other than the photointerruptor may be used as the position detection sensor. For example, a hall sensor may be used as the position detection sensor.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-223286, filed Dec. 10, 2019, which is hereby incorporated by reference herein in its entirety.

What is claimed is:

1. An apparatus comprising:
a rotation detection unit configured to detect rotation of a rotating body on which an imaging unit is provided;
a determination unit configured to determine a rotation direction of the rotating body based on an output of the rotation detection unit;
a position detection unit configured to detect a predetermined position of the rotating body based on positions of a first member provided on the rotating body and a second member provided on a fixed section that moves relative to the rotating body; and
a control unit configured to perform control such that the position detection unit is energized in a case where the determined rotation direction is a first direction where the first member and the second member approach each other, and that the position detection unit is not energized in a case where the determined rotation direction is a second direction where the first member and the second member separate from each other.

2. The apparatus according to claim 1, wherein the control unit performs control so as to intermittently energize the position detection unit in a case where the rotation direction is the first direction.

3. The apparatus according to claim 2, wherein the control unit determines a period of energization performed intermittently on the position detection unit in accordance with a rotation speed of the detected rotating body.

4. The control apparatus according to claim 2, wherein the control unit performs control such that a period of energization performed intermittently on the position detection unit is longer in a standby state where imaging by an imaging unit is restricted than in a normal state where imaging by the imaging unit is possible.

5. The apparatus according to claim 1, wherein the control unit performs control such that to energize the position detection unit in a case where the output of the rotation detection unit is more than or equal to a predetermined value, and not to energize the position detection unit in a case where the output of the rotation detection unit is less than the predetermined value.

6. The apparatus according to claim 1, wherein the rotation detection unit is an angular velocity sensor.

7. The apparatus according to claim 1, wherein the rotation detection unit is an encoder.

8. A method for controlling energization to a position detection unit configured to detect a predetermined position of a rotating body on which an imaging unit is provided, the method comprising:
detecting rotation of a rotating body;
determining a rotation direction of the rotating body on a basis of a result of detected rotation;
detecting a predetermined position of the rotating body based on positions of a first member provided on the rotating body and a second member provided on a fixed section that moves relative to the rotating body; and
performing control such that a position detection unit is energized in a case where the rotation direction determined in the direction determination is a first direction where the first member and the second member approach each other, and that the position detection unit is not energized in a case where the rotation direction determined in the direction determination is a second direction where the first member and the second member separate from each other.

9. The method according to claim 8, wherein the performing performs control so as to intermittently energize the position detection unit in a case where the rotation direction is the first direction.

10. The method according to claim 9, wherein the performing control determines a period of energization performed intermittently on the position detection unit in accordance with a rotation speed of the detected rotating body.

11. The method according to claim 9, wherein the performing performs control such that a period of energization performed intermittently on the position detection unit is longer in a standby state where imaging is restricted than in a normal state where imaging is possible.

12. The method according to claim 8, wherein the performing performs control such that to energize the position detection unit in a case where the output of the detecting is more than or equal to a predetermined value, and not to energize the position detection unit in a case where the output of the detecting is less than the predetermined value.

13. The method according to claim 8, wherein the detecting rotation is detected by an angular velocity sensor or an encoder.

14. A non-transitory computer-readable storage medium storing a program for causing a computer to execute a method for controlling energization of a position detection unit configured to detect a predetermined position of a rotating body on which an imaging unit is provided, the method comprising:
    detecting rotation of a rotating body;
    determining a rotation direction of the rotating body on a basis of a result of detected rotation;
    detecting a predetermined position of the rotating body on a basis of positions of a first member provided on the rotating body and a second member provided on a fixed section that moves relative to the rotating body; and
    performing control in such a manner that a position detection unit is energized in a case where the rotation direction determined in the direction determination is a first direction where the first member and the second member approach each other, and that the position detection unit is not energized in a case where the rotation direction determined in the direction determination is a second direction where the first member and the second member separate from each other.

15. The non-transitory computer-readable storage medium according to claim 14, wherein the performing performs control so as to intermittently energize the position detection unit in a case where the rotation direction is the first direction.

16. The non-transitory computer-readable storage medium according to claim 15, wherein the performing control determines a period of energization performed intermittently on the position detection unit in accordance with a rotation speed of the detected rotating body.

17. The non-transitory computer-readable storage medium according to claim 15, wherein the performing performs control such that a period of energization performed intermittently on the position detection unit is longer in a standby state where imaging is restricted than in a normal state where imaging is possible.

18. The non-transitory computer-readable storage medium according to claim 14, wherein the performing performs control such that to energize the position detection unit in a case where the output of the detecting is more than or equal to a predetermined value, and not to energize the position detection unit in a case where the output of the detecting is less than the predetermined value.

19. The non-transitory computer-readable storage medium according to claim 14, wherein the detecting rotation is detected by an angular velocity sensor or an encoder.

* * * * *